(12) United States Patent
Oag et al.

(10) Patent No.: US 11,359,450 B2
(45) Date of Patent: Jun. 14, 2022

(54) DOWNHOLE TOOL WITH A PROPELLANT CHARGE

(71) Applicant: SPEX Corporate Holdings Limited, Aberdeen (GB)

(72) Inventors: Jamie Oag, Aberdeenshire (GB); Rae Younger, Aberdeenshire (GB); Sidney Dantuma Johnston, Aberdeenshire (GB)

(73) Assignee: SPEX CORPORATE HOLDINGS LIMITED, Aberdeen (GB)

( * ) Notice: Subject to any disclaimer, the term of this patent is extended or adjusted under 35 U.S.C. 154(b) by 31 days.

(21) Appl. No.: 16/901,114

(22) Filed: Jun. 15, 2020

(65) Prior Publication Data

US 2021/0032949 A1    Feb. 4, 2021

Related U.S. Application Data

(60) Division of application No. 16/003,391, filed on Jun. 8, 2018, now Pat. No. 10,954,734, which is a
(Continued)

(30) Foreign Application Priority Data

Nov. 18, 2014  (GB) ...................................... 1420491
Apr. 13, 2015  (GB) ...................................... 1506265

(51) Int. Cl.
*E21B 29/02*    (2006.01)
*E21B 43/116*    (2006.01)
(Continued)

(52) U.S. Cl.
CPC .............. *E21B 29/02* (2013.01); *B23K 7/006* (2013.01); *E21B 33/12* (2013.01); *E21B 33/134* (2013.01); *E21B 43/116* (2013.01); *E21B 33/13* (2013.01)

(58) Field of Classification Search
CPC .. E21B 43/1195; E21B 34/066; E21B 43/045; E21B 7/007; E21B 17/18; E21B 34/06
See application file for complete search history.

(56) References Cited

U.S. PATENT DOCUMENTS 3,318,395 A   5/1967   Messmer
4,180,131 A   12/1979  Chammas
(Continued)

OTHER PUBLICATIONS

Examination Report for corresponding Australian Application No. 2016100791, dated Oct. 28, 2016.
(Continued)

*Primary Examiner* — Zakiya W Bates
(74) *Attorney, Agent, or Firm* — Tarolli, Sundheim, Covell & Tummino LLP

(57) ABSTRACT

A tool for manipulating a tubular, such as casing or production tubing, in a downhole environment, includes a housing defining a chamber, the chamber having at least one outlet, a propellant source located within the chamber and an ignition mechanism for igniting the propellant source. Upon ignition of the propellant source, the propellant deflagrates, creating at least one stream of combustion products, the chamber directing the stream of combustion products through the/each outlet, towards the tubular to be manipulated, the/each stream of combustion products combining with at least one modifying agent to manipulate the tubular.

33 Claims, 7 Drawing Sheets

Related U.S. Application Data continuation of application No. 15/527,970, filed as application No. PCT/GB2015/053507 on Nov. 18, 2015, now Pat. No. 10,041,321.

(51) Int. Cl.
*E21B 33/12* (2006.01)
*E21B 33/134* (2006.01)
*B23K 7/00* (2006.01)
*E21B 33/13* (2006.01)

(56) References Cited

U.S. PATENT DOCUMENTS

| | | |
|---|---|---|
| 4,298,063 A | 11/1981 | Regalbuto et al. |
| 4,352,397 A | 10/1982 | Christopher |
| 4,598,769 A | 7/1986 | Robertson |
| 4,762,175 A | 8/1988 | Perricone |
| 5,316,087 A | 5/1994 | Manke et al. |
| 5,435,394 A | 7/1995 | Robertson |
| 6,024,169 A | 2/2000 | Haugen |
| 2003/0051870 A1 | 3/2003 | Robertson |
| 2005/0092488 A1 | 5/2005 | Rodet et al. |
| 2008/0000687 A1 | 1/2008 | Xu et al. |
| 2008/0257549 A1 | 10/2008 | Swor et al. |
| 2011/0094406 A1 | 4/2011 | Marya et al. |
| 2011/0283872 A1 | 11/2011 | Brooks |
| 2013/0126153 A1 | 5/2013 | Baker |
| 2014/0238678 A1 | 8/2014 | Arrell, Jr. et al. |
| 2014/0262328 A1 | 9/2014 | Robertson |
| 2017/0167224 A1 | 6/2017 | Holder |

OTHER PUBLICATIONS

Search Report for corresponding Great Britain Application No. GB15203525.0, dated Mar. 7, 2016.
International Search Report and Written Opinion for corresponding PCT Application No. PCT/GB2015/053507.

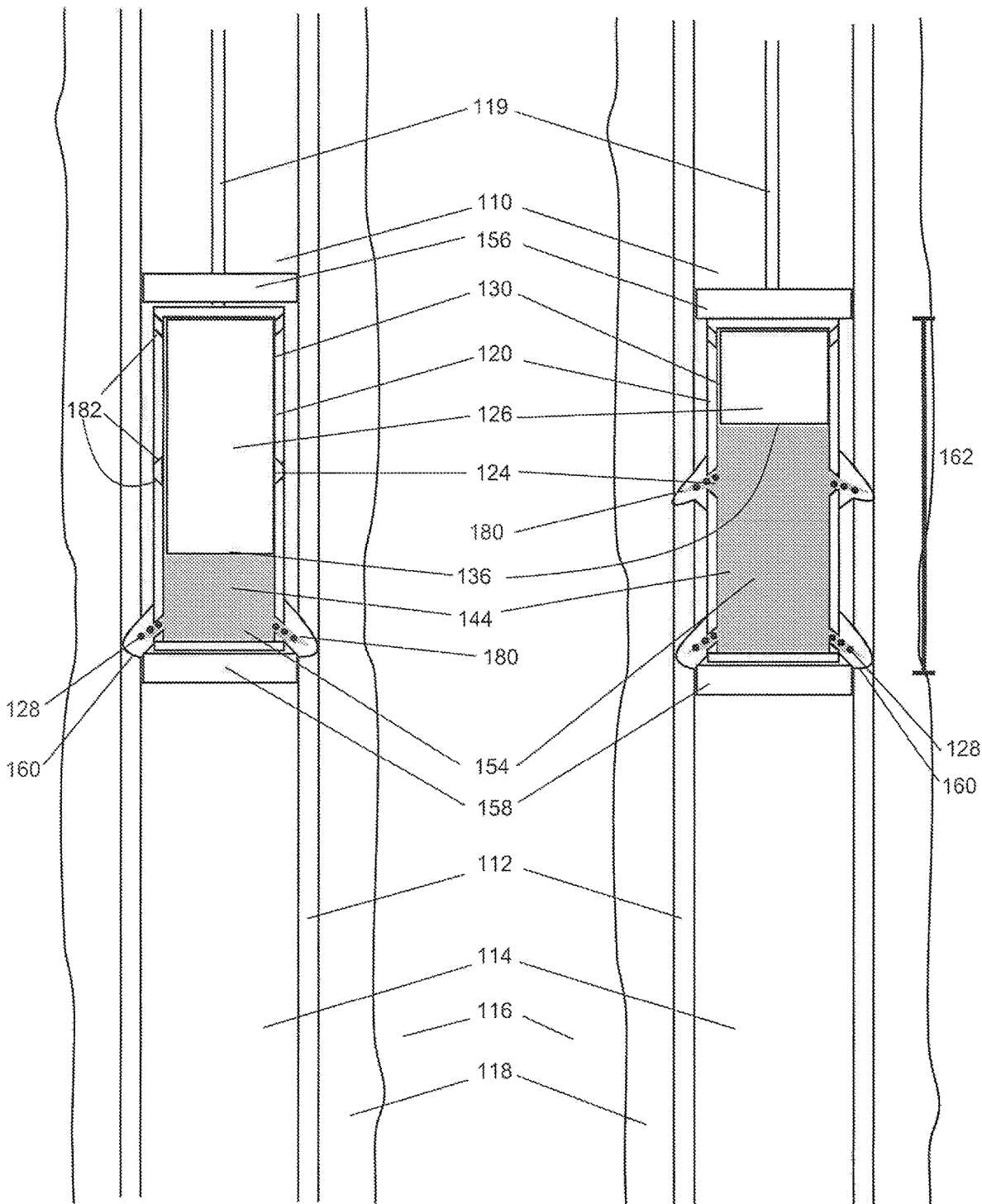

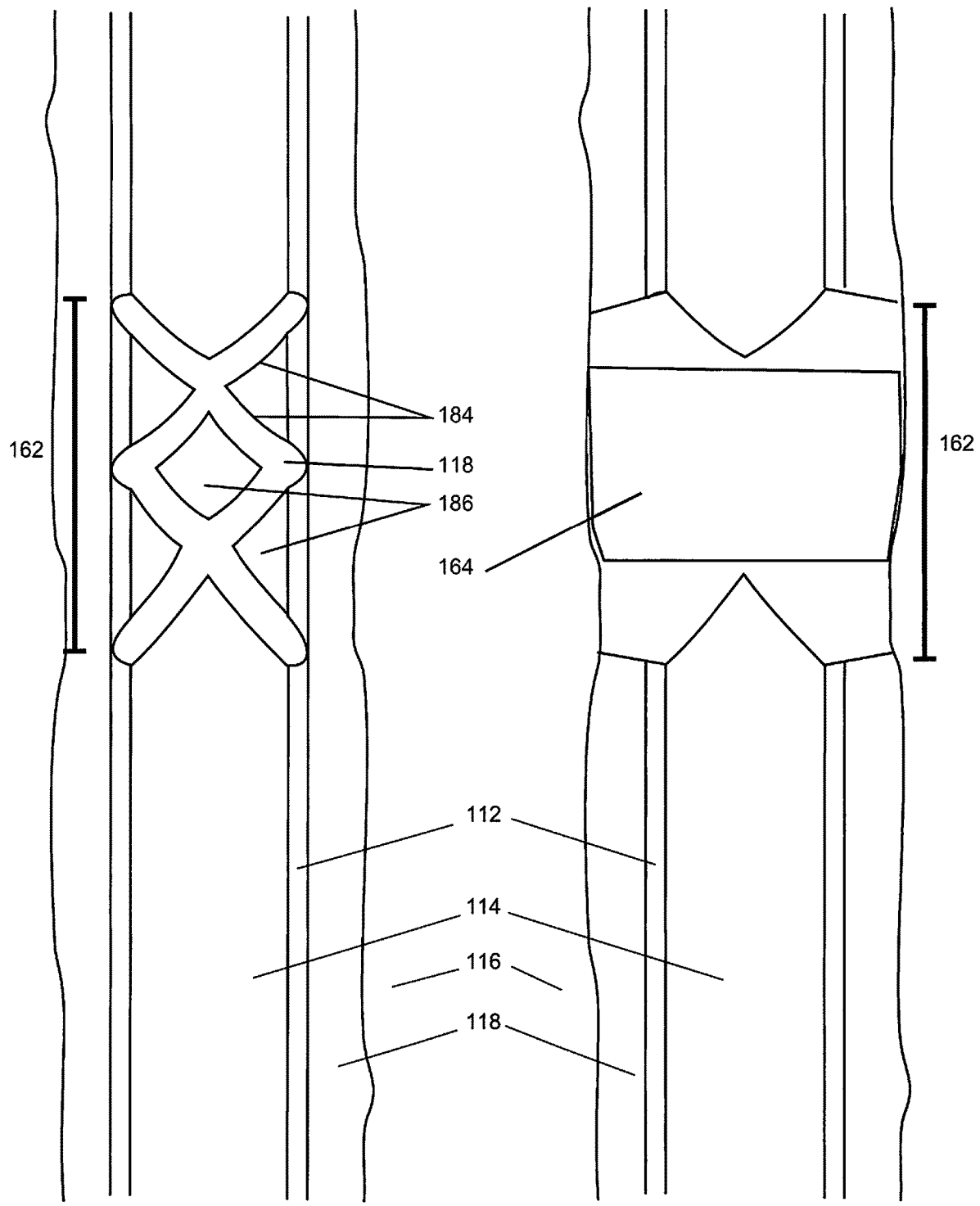

DOWNHOLE TOOL WITH A PROPELLANT CHARGE

RELATED APPLICATIONS

The present application is a Divisional of U.S. patent application Ser. No. 16/003,391, filed on Jun. 8, 2018, which is a Continuation of U.S. patent application Ser. No. 15/527,970, filed on May 18, 2017, which is a U.S. National Stage Application under 35 USC 371, claiming priority to PCT Serial No. PCT/GB2015/053507, filed on Nov. 18, 2015; which claims priority to Great Britain Patent Application Serial No. GB 1420491.1, filed on Nov. 18, 2014, and Great Britain Patent Application Serial No. 1506265.6, filed on Apr. 13, 2015, the entirety of all of which are incorporated herein by reference.

FIELD

The present invention relates to a tool for manipulating a tubular, such as casing or production tubing, in a downhole environment. Particularly, embodiments of the present invention relate to a tool for stripping casing and cement in a well abandonment operation.

BACKGROUND

There are situations in which it is desirable to remove a portion of casing or tubing from an oil or gas well. A typical situation may be to remove a length of casing to allow a permanent cement plug to be installed, prior to well abandonment. Current Oil and Gas UK Guidelines for the Abandonment of Wells (July 2015, Issue 5) dictate that a permanent barrier, typically a cement plug, must be formed between the reservoir and the seabed to act as one of a number of permanent barriers when a well is abandoned or plugged. This measure is intended to isolate the well and reduce the possibility of pressure migration in order to prevent hydrocarbons and other well fluids from underground reservoirs leaking past the barrier(s) and coming to surface and spilling into the sea.

In some situations, prior to installing the cement plug to abandon or plug the well, it is necessary to remove the production tubing, casing and other downhole tubulars, and the cement or other downhole fixings that secure the well to the bedrock.

Casing may also be removed to undertake a casing repair, or to expose the cement behind the casing to allow cement repair. In some cases, where cemented casing is used, for example, there may be a leak path in the cement behind the casing or between casing layers. Rectifying such a breach may also require the removal of a casing section and associated cement before forming new cement and repairing the casing.

Conventional removal of cemented casing uses, for example, milling tools or hydro-abrasive cutters which remove the casing and associated cement by gradually cutting or milling away small portions of metal and cement. These are slow processes and therefore make such an operation very expensive and time consuming.

Perforating charges have also historically been used to penetrate a casing wall, to allow fluid communication through the casing wall and to allow cementing behind. Perforations only produce small holes through the target, whereas large holes are often desirable.

SUMMARY

According to a first aspect of the present invention there is provided a tool for manipulating a tubular in a downhole environment, the tool comprising:
a housing defining a chamber, the chamber having at least one outlet;
a propellant source located within the chamber;
an ignition mechanism for igniting the propellant source; and
at least one modifying agent provided in or adjacent the tool or generated by the tool;
wherein upon ignition of the propellant source, the propellant source is adapted to deflagrate, creating at least one stream of combustion products, the chamber directing the stream of combustion products through the/each outlet, towards the tubular to be manipulated, the/each stream of combustion products combining with at least one modifying agent to manipulate the tubular.

In at least one embodiment of the invention a tool is provided which uses a stream of combustion products created by combustion of a propellant source to manipulate a tubular by, for example, ablation, cutting, displacement, removal, heating, abrasion, or erosion. This method is much faster than conventional processes leading to time and resource savings, and associated reduced costs.

A propellant is an explosive material which has a low rate of combustion and once ignited burns or otherwise decomposes to produce propellant gas. This gas is highly pressurised, the pressure driving the gas and other combustion products away from the propellant, forming a stream of combustion products. A propellant can burn smoothly and at a uniform rate after ignition without depending on interaction with the atmosphere, and produces propellant gas and/or heat on combustion and may also produce additional combustion products.

In use, the/each stream of combustion products and/or the modifying agent may erode, ablate, abrade or remove at least a portion of the tubular to be manipulated.

In use, the/each stream of combustion products may heat the tubular to be manipulated and the modifying agent may impinge at least a portion of the tubular to be manipulated, transferring energy to the tubular to be manipulated.

At least a portion of the tubular to be manipulated may be forcibly displaced or moved by the/each stream of combustion products and/or the modifying agent which impinge the tubular.

At least a portion of the tubular to be manipulated may be fractured, fragmented or cracked by the/each stream of combustion products and/or the modifying agent which impinge the tubular.

The tool may be anchored relative to the tubular to be manipulated. The/each stream of combustion products leads to a thrust effect which seeks to drive the tool in the opposite direction to the flow of the/each stream. In at least one embodiment, anchoring the tool relative to the tubular to be manipulated, creates a powerful stream of combustion products which can be used with the modifying agent, to manipulate a tubular.

The tool may be anchored to the tubular.

The propellant source may be anchored relative to the tubular to be manipulated.

The propellant source may comprise a plurality of propellants.

Where there is a plurality of propellants, each propellant may combust separately.

The propellants may be separated by a barrier.

The barrier may comprise a non-combustible layer.

The barrier may comprise a void.

The void may be defined by adjacent propellants.

Where there is a plurality of propellants, at least some of the propellant sources may be ignited in a sequence.

Where there is a plurality of propellants, at least some of the propellants may be ignited substantially simultaneously.

Where there is a plurality of propellants, at least some of the propellants may be equidistant from an outlet.

Alternatively, at least some of the propellants may be arranged at varying distances from an outlet.

Where there is a plurality of propellants, at least some of the propellants may be associated with one outlet.

In alternative embodiments, where there is a plurality of propellants, at least one propellant may share an outlet with at least one other propellant.

The direction of the stream of combustion products may be, at any time, altered within the housing or external to the housing by biasing at least a portion of the combustion products to a different direction.

A change in direction of the stream of combustion products may be achieved or partially achieved by a surface or surfaces protruding into the combustion products flow path.

A change in direction of the stream of combustion products may be achieved or partially achieved by a differential pressure or differential pressures acting on the combustion products flow path.

A change in direction of the stream of combustion products may be achieved or partially achieved by the introduction of additional fluid, gas or solid media or a plurality of media to the combustion products flow path.

A change in direction of the stream of combustion products may be achieved or partially achieved by a centrifugal or other acceleration force which acts on a combustion product or combustion products.

The direction of the stream of combustion products may change with respect to time during the tool operation.

The stream of combustion products may be singular. There may be multiple streams of combustion products. The stream(s) of combustion products may divide or recombine inside and/or outside of the housing. The plurality of combustion product streams may change with respect to time during the tool operation.

The propellant source may be positioned such that the/ each stream of combustion products flows, initially, in a direction perpendicular to the/each stream of combustion products when the combustion products are in the tool.

Where the propellant source comprises a plurality of propellants, the propellants may be arranged to generate streams of combustion products which flow in different directions and/or flow at different times.

Where the propellant source comprises a plurality of propellants, at least one propellant may have a different function to at least one of the other propellants. For example, one propellant may heat the tubular to be manipulated and another propellant may erode, ablate, abrade or remove the tubular to be manipulated.

In at least one embodiment of the tool the/each stream of combustion products may be generated without generating heat or with minimal heat generation. Certain types of propellant can combust without generating heat and the risk of igniting flammable materials that may be in close proximity to the/each stream of combustion products is reduced or eliminated. Additionally, mineral heat generation reduces damage to the tool.

The propellant source may comprise a solid propellant.

Alternatively or additionally, the propellant source may comprise a liquid, paste, foam or gel propellant.

The propellant source may be wholly contained within the housing.

In alternative embodiments, the propellant source may be fed into the housing. Feeding the tool with propellant allows the tool to be used continuously. The propellant source may be fed into the housing in the form of pellets.

The propellant source may be fed into the housing either continuously or intermittently.

The propellant source may be formed by combining two or more materials within the tool.

The propellant source may be arranged to create an intermittent stream of combustion products.

The propellant source may be a single state, a solid, liquid or gas or may be in two or more states.

Alternatively the propellant source may comprise propellants in separate states, which are combined at or prior to combustion initiation.

Alternatively or additionally the propellant sources may change state prior to ignition.

The propellant source may comprise a covering.

The covering may cover a section of the surface of the propellant source, the covering defining an aperture, the aperture exposing the surface portion of the propellant, the exposed surface portion being the portion of the surface which deflagrates. The covering prevents oxygen reaching the propellant surface allowing the area of the propellant surface which burns and the rate of propellant burn to be controlled.

The covering may control the direction of flow of the/each stream of combustion products.

Once ignited, the propellant source may define a combustion zone.

As the propellant source deflagrates, the combustion zone may move relative to the tubular to be manipulated.

The tool may further comprise at least one deflector for deflecting the/each stream of combustion products. The/each stream of combustion products may be deflected multiple times before reaching a target.

The/each deflector may define a deflection surface.

The/each deflector may be movable.

The/each deflector may be positioned in the path of the/each stream of combustion products.

The/each deflector may move into the path of the/each stream of combustion products.

The/each deflector may move out of the path of the/each stream of combustion products.

The/each deflector position may be controlled by a motor and/or actuator.

The/each deflector may be arranged to deflect the/each stream of combustion products towards an outlet.

The/each deflector may be arranged to split the/each stream of combustion products.

The/each deflector may be arranged to change the direction of the/each stream of combustion products.

The/each deflector may maintain a substantially constant distance from the combustion zone.

The/each deflector position may be controlled by reacting with the/each stream of combustion products.

The/each deflector position may be controlled by the combustion process.

The/each deflector may alter in response to the/each stream of combustion products.

The/each deflector profile may change in response to thermal and/or pressure input from the/each stream of combustion products and/or surroundings.

The/each deflector profile may change due to erosion from the/each stream of combustion products.

In at least one embodiment the/each deflector comprises a sacrificial surface.

In at least one embodiment of the present invention the/each deflector has a coating which is gradually eroded, ablated, abraded or removed by the/each stream of combustion products. As the deflector is altered it changes the profile of the deflector, which in turn changes the geometric vector and/or position of the/each stream of combustion products.

In at least one embodiment of the present invention the/each deflector is bimetallic with multiple layers of metal with different thermal expansion ratios. In response to thermal input the deflector shape is altered.

A stream of combustion products may be deflected or moved by another stream of combustion products interaction. In at least one embodiment of the present invention the/each stream of combustion products impinges with the/each opposing stream of combustion products, which deflects the/each stream of combustion products from its original geometric vector.

The deflector(s) may bifurcate the/each stream of combustion products into two or more stream of combustion products.

The deflector(s) may divide the/each stream of combustion products into two or more constituent parts.

The deflector(s) may manipulate the/each stream of combustion products into a desired shape.

The deflector(s) may impart rotation to the/each stream of combustion products.

The/each stream of combustion products may be parallel to the housing and deflected outwardly by a deflector.

There may be a plurality of outlets.

The outlet(s) may extend circumferentially around the housing.

The outlet(s) may extend axially along the housing.

The outlet(s) may define a circular cross-section. A circular outlet will facilitate the generation of a stream of combustion products. Similarly, a stream of combustion products could be generated by an outlet of square cross-section or any outlet which has a cross-section of similar breadth and width. Outlets such as these could punch holes in to the tubular to be manipulated.

Alternatively or additionally, the outlet(s) may be elongate. An elongate outlet will facilitate the generation of a plane of combustion products.

Where the outlet(s) is elongate, the outlet(s) may also be convoluted.

Where there are a plurality of outlets, there may be a combination of elongate and non-elongate outlets.

Where the outlet(s) extend axially along the housing the outlet(s) may open over a period of time.

In this embodiment, each outlet or sections of an outlet may open sequentially along the length of the tool.

The outlet(s) may be sealed.

In at least one embodiment, the outlet(s) may be sealed by an opening mechanism.

The opening mechanism may be adapted to open the outlet(s) in response to an environmental condition being reached. For example, the opening mechanism may be adapted to open the outlet(s) when pressure inside the tool housing reaches a certain level. This may be useful where, for example, the environmental pressure outside the tool housing is higher than the pressure within the tool housing prior to ignition of the propellant source. Providing a sealed outlet prevents fluid in the environment surrounding the tool from entering tool through the outlet. Upon ignition of the propellant source, the pressure inside the housing rises and at a threshold pressure, higher than the environmental pressure, the outlet(s) can open allowing the/each stream of combustion products to exit the outlet(s).

The opening mechanism may comprise a frangible portion. The frangible portion may be adapted to break or shear at a threshold pressure.

In alternative embodiments, the opening mechanism may be adapted to open in response to a signal, for example from surface.

The/each stream of combustion products may be intermittent through the outlets.

At least one outlet may eject a stream of combustion products with different properties than other outlets. In at least one embodiment of the present invention a stream of combustion products with different properties than another stream of combustion products may be used to produce a different effect. For example, when removing casing and cement in a well abandonment operation, one stream of combustion products could cut the metallic casing and the other stream of combustion products could shatter and/or remove the cement behind the casing.

At least a portion of at least one outlet may point obliquely outwards from the tool housing.

At least a portion of at least one outlet may point perpendicularly outwards from the tool housing.

At least a portion of each of a plurality of outlets may point in convergent directions.

In at least one embodiment of the present invention convergent outlets create a stream of combustion products that has greater penetration into the target material than the/each stream of combustion products created by a single outlet.

At least some of the/each outlet may point in convergent directions and their respective stream of combustion products converge at or beyond the target surface.

At least some of the/each adjacent outlet may point in convergent directions and their respective stream of combustion products converge before reaching the target surface.

In at least one embodiment of the present invention the/each outlet may be a nozzle having a nozzle inlet and a nozzle outlet, the nozzle being in fluid communication with chamber.

In at least one embodiment of the present invention the/each nozzle directs or biases the/each stream of combustion products in a particular direction. The/each nozzle can include a venturi or de laval or similar geometry to expand and/or accelerate the/each stream of combustion products, which imparts greater speed and/or kinetic energy to the/each stream of combustion products from the tool.

Additionally the/each nozzle imparts a desired shape to the/each stream of combustion products which is ejected from the tool.

At least one of the/each nozzle may be moveable with respect to the tool housing. In at least one embodiment of the present invention moveable nozzles are used to penetrate the target forming closed shapes that are subsequently removed with ease. With moveable nozzles, the shapes can be created without moving the entire tool.

In at least one embodiment of the present invention nozzles are positioned on movable arms, allowing the tool to pass through narrow restrictions and expand to bring the arms closer to the target when through the restriction.

At least one of the/each moveable nozzle may move defining a pattern on the tubular to be manipulated.

Where the at least one outlet comprises a plurality of outlets, at least one outlet may face in an opposite direction to at least one other outlet. Such an arrangement, in some embodiments, will serve to balance the tool, as the thrust generated by the/each stream of combustion products through opposite facing outlets will balance.

The thrust force from an outlet may be used to move the tool in a well.

The thrust force from an outlet may be used to bring the tool into closer proximity to the target.

The thrust force from an outlet may be used to move components within the tool.

In at least one embodiment of the present invention the thrust from the tool moves the outlet in a circular path to cut circular sections from the target.

The pressure generated by the combustion process may be used to move the tool.

The pressure generated by the combustion process may be used to bring the tool into closer proximity to the target.

The pressure generated by the combustion process may be used to move components within the tool.

The chamber within the tool may maintain a constant volume.

In at least one embodiment of the present invention the pressure generated by the combustion process moves the propellant within the tool to maintain a constant volume chamber.

At least one of the/each stream of combustion products may be linear.

At least one of the/each stream of combustion products may be circumferential.

At least one of the/each stream of combustion products may impart a rotation to the/each stream of combustion products.

At least one modifying agent may be formed by the combustion of the propellant source.

Alternatively or additionally, at least one modifying agent may be formed separately from the combustion of the propellant source.

Alternatively or additionally, at least one modifying agent may be present prior to ignition of the propellant source.

The/each modifying agent may be solid, liquid and/or gas or any combination thereof.

At least one modifying agent may be contained within the propellant source. For example the at least one modifying agent may be exposed as the propellant source combusts.

In at least one embodiment at least one modifying agent introduces new chemicals to the combustion process.

In at least one embodiment at least one modifying agent reacts with the propellant constituent(s).

In at least one embodiment at least one modifying agent may react as a result of the combustion temperature.

In at least one embodiment at least one modifying agent may react with the combustion products and/or the/each stream of combustion products.

In at least one embodiment at least two modifying agents may react with each other.

In at least one embodiment at least one modifying agent may react with the environment and/or the target material(s).

In at least one embodiment at least one modifying agent may influence the combustion process.

In at least one embodiment at least one modifying agent may change state during and/or after the combustion process.

In at least one embodiment at least one modifying agent may be introduced into the propellant gas and/or combustion products.

In at least one embodiment at least one modifying agent may be drawn into the propellant gas and/or stream of combustion products by a venturi or similar geometric profile.

In at least one embodiment at least one modifying agent may be mechanically or forcibly introduced into the propellant gas and/or stream of combustion products.

In at least one embodiment at least one modifying agent may already be present in the tubular to be manipulated.

In at least one embodiment of the present invention at least one modifying agent may include solid particles. Solid particles can cause abrasion of the material to be manipulated.

Alternatively or additionally at least one modifying agent may contain liquid droplets. Liquid droplets can cause erosion of the material to be manipulated.

The liquid droplets may be explosive and may explode on impact with the target. In at least one embodiment of the present invention explosive liquid droplets increase the penetrating power of the/each stream of combustion products and/or additional materials.

In at least one embodiment of the present invention at least one modifying agent may include a chemical etching compound. In at least one embodiment of the present invention a chemical etching compound may complement the eroding power of the/each stream of combustion products and/or additional materials by reacting with the target material.

The modifying agent may become part of the/each stream of combustion products within the housing.

The modifying agent may become part of the/each stream of combustion products outwith the housing.

The modifying agent may be applied to the surface of the tubular to be manipulated.

In some embodiments, the modifying agent may be a flux. The flux may be applied to the surface of the tubular to be manipulated providing a method of transferring heat from the/each stream of combustion products to the tubular to be manipulated material.

The housing may include a sacrificial portion.

The housing may be pressure and/or heat containing.

In at least one embodiment, the/each stream of combustion products may erode, ablate, abrade or remove the sacrificial housing portion, erosion of the sacrificial housing portion releasing at least one modifying agent into the/each stream of combustion products.

The/each stream of combustion products may impart heat to the modifying agent.

The/each stream of combustion products may impart velocity to the modifying agent.

The/each stream of combustion products may impart a chemical reaction to the modifying agent.

The tool may further include a sealing mechanism.

The sealing mechanism may be adapted to form a seal to isolate a section of tubular to be manipulated. The use of two or more seals may be desirable to isolate a section of tubular to be manipulated to, for example, remove well fluids from the section or to reduce pressure within the section to maximise the manipulative effect of the tool on the tubular to be manipulated.

In at least one embodiment of the present invention the sealing mechanism is a packer or sealing element above and/or below the housing.

The tool may comprise an enhancing mechanism for enhancing the/each stream of combustion products.

In some embodiments the enhancing mechanism may change the flow characteristics of the/each stream of combustion products.

The flow characteristics which may be changed include, but are not limited to, the thrust on the/each stream of combustion products or energy in the/each stream of combustion products or the direction of the/each stream of combustion products.

In these embodiments, the enhancing mechanism may be the application of an eddy current to the/each stream of combustion products.

The eddy current may be pulsed.

The enhancing mechanism may impart additional energy to the/each stream of combustion products or change the shape and/or direction of the/each stream of combustion products.

In these embodiments, the additional energy or the shape and/or direction change may be imparted to the/each stream of combustion products by ionisation.

The/each stream of combustion products may be at least partially ionised by at least part of the/each stream of combustion products coming into contact with an electrical arc.

The/each stream of combustion products may be ionised by passing through an induction coil.

In these and alternative embodiments, the additional energy or the shape and/or direction change may be imparted to the/each stream of combustion products by passing at least a portion through a magnetic field and/or electric field, or through a source of microwave radiation.

The enhancing mechanism may be able to generate the modifying agent in the well. For example hydrocarbons could be burned to generate particles.

Alternatively aluminium coated with an oxidiser could be burned to generate sapphire-like particles.

In further alternatives, a metal rod could be introduced adjacent the tubular to be manipulated, the metal rod melting into the/each stream of combustion products to form molten metal with which to melt the tubular to be manipulated.

The enhancing mechanism may be oxygen to enhance the burning of the propellant or the tubular to be manipulated. In some embodiments, the tubular to be manipulated itself can become a fuel source. Where the tubular to be manipulated is iron, introduction of oxygen and heat can form iron oxides which burn.

In some embodiments, the enhancing mechanism may be a treatment to change the physical properties of the tubular to be manipulated. For example the tubular to be manipulated may be cooled by the application of liquid nitrogen, liquid carbon dioxide or any other suitable cooling fluid, to make it shatter more easily.

The enhancing mechanism may be the introduction of an additional form of propellant. For example a magnesium rod could be introduced which would decay to form a propellant.

In further alternatives, the enhancing mechanism could be the production of a gas, in some embodiments through propellant combustion, which displaces the fluid in the vicinity of the tool. The tool then produces a stream of combustion products, which interacts with the target in a gaseous environment, with increased efficiency.

The enhancing mechanism may be an acid. In at least one embodiment of the present invention the tool may release an acid wash to remove any cement remaining in the borehole section that is to be repaired after the casing has been cut and removed during a well abandonment operation.

The ignition mechanism may comprise a pyrotechnic igniter, an electro-pyrotechnic igniter, an electrical igniter, a chemical igniter.

Where the igniter is an electrical igniter, the electrical igniter may comprise a bridgewire.

Alternatively or additionally the electrical igniter may be adapted to create a spark.

According to a second aspect of the present invention there is provided a method of manipulating a tubular in a downhole environment, the method comprising the steps of:

positioning a tool having a housing defining a chamber, the chamber having at least one outlet; a propellant source located within the chamber; and an ignition mechanism for igniting the propellant source adjacent a tubular to be manipulated, igniting the propellant source such that at least one stream of combustion products is generated, the chamber directing the/each stream of combustion products through the/each outlet, the outlet directing the/each stream of combustion products towards the tubular to be manipulated, the/each stream of combustion products including a modifying agent to modify the tubular to be manipulated.

The method may further comprise the step of increasing thrust of the/each stream of combustion products.

The method may further comprise the step of increasing the energy of the/each stream of combustion products.

The method may further comprise the step of changing the direction of the/each stream of combustion products. The thrust or energy of the/each stream of combustion products or the direction of flow of the/each stream of combustion products may be changed, for example, by applying an eddy current, an electromagnetic field, microwaves or applying an induction force to the/each stream.

The method may further comprise the step of applying a shockwave to the tubular to be manipulated.

The method may further comprise the step of changing the physical properties of the tubular to be manipulated.

The method may further comprise the step of cooling the tubular to be manipulated. This may be achieved by the application of liquid nitrogen, liquid carbon dioxide or any other suitable cooling fluid.

The method may further comprise the step of applying mechanical force to the tubular to be manipulated. The application of mechanical force, subsequent to manipulation of the tubular to be manipulated by the modifying agent, can assist in removal of the tubular to be manipulated and associated cement, either between tubulars or between the tubular and the bedrock.

According to a third aspect of the present invention there is provided a tool for manipulating material in a downhole environment, the tool comprising:

a confined propellant source;

an ignition mechanism for igniting the propellant source;

wherein upon ignition of the propellant source, the propellant deflagrates, creating at least one stream of combustion products, the propellant source being confined such that the/each stream of combustion products are directed towards the material to be manipulated.

The tool may comprise a housing.

The propellant source may be confined in a housing.

In other embodiments the tool housing may comprise the propellant source.

The housing may define a chamber, the chamber having at least one outlet.

The propellant source may be directed towards the material to be manipulated through the chamber outlets.

The propellant source may be located within the chamber.

The tool may further comprise at least one modifying agent, the modifying agent combining with the/each stream of combustion products to manipulate the material.

The material may be a tubular.

The/each stream of combustion products may be directed towards an internal or external surface of the tubular.

According to a fourth aspect of the present invention there is provided a tool for manipulating a material, the tool comprising:

a body defining a chamber for housing at least one propellant source;

at least one nozzle, the/each nozzle having an inlet and an outlet, the the/each inlet being in fluid communication with the chamber; and at least one mechanism for igniting the/each propellant sources;

wherein, upon ignition, at least one of the propellant sources combusts to release a combustion jet which, in use, flows out of the tool through the/each nozzle outlet towards a material to be manipulated.

The combustion jet may be at least one stream of combustion products.

The body may be a housing.

According to a fifth aspect of the present invention there is provided a method of penetrating a section of tubular, the method comprising:

providing a tool, the tool comprising
a body defining a chamber for housing a propellant,
at least one nozzle, the/each nozzle having an inlet and an outlet, the/each inlet being in fluid communication with the chamber and
at least one mechanism for igniting the propellant;
wherein, upon ignition, the propellant releases a gas which flows out of the tool through the/each nozzle outlet in the form of at least one gas jet towards, in use, a tubular surface to be penetrated;
running the tool into the tubular at a desired location; and
penetrating the internal surface of the tubular with the/each gas jet.

According to a sixth aspect of the invention there is provided a method to remove a section of casing or tubing from a downhole location, the method comprising:

providing a tool, the tool comprising
a body defining a chamber for housing a propellant,
at least one nozzle, the/each nozzle having an inlet and an outlet, the/each inlet being in fluid communication with the chamber and
at least one mechanism for igniting the propellant;
wherein, upon ignition, the propellant releases a gas which flows out of the tool through the/each nozzle outlet in the form of at least one gas jet towards, in use, a tubular surface to be penetrated;
running the tool into the casing at a desired location;
penetrating the internal surface of the casing with the/each gas jet; and
removing fragments of casing from their original location.

According to a seventh aspect of the invention there is provided a method of plugging an oil or gas well to be abandoned or decommissioned, the method comprising:

providing a tool, the tool comprising
a body defining a chamber for housing a propellant,
at least one nozzle, the/each nozzle having an inlet and an outlet, the/each inlet being in fluid communication with the chamber and
at least one mechanism for igniting the propellant;
wherein, upon ignition, the propellant releases a gas which flows out of the tool through the/each nozzle outlet in the form of at least one gas jet towards, in use, a tubular surface to be penetrated;
the body of the tool may itself be a propellant cast;
running the tool into the casing at a desired location;
penetrating the internal surface of the casing with the/each gas jet;
removing fragments of casing and cement from their original location; and
providing cement to form a plug.

It will be understood that features listed as preferable non-essential in respect of one aspect may be equally applicable to another aspect and are not repeated for brevity.

BRIEF DESCRIPTION OF THE DRAWINGS embodiments of the present invention will now be described with reference to the accompanying drawings in which:

FIG. 9 is a section of the tool of FIG. 7 during deflagration of the propellant source;

FIG. 10 is a section of the tool of FIG. 7 during deflagration of the propellant source;

FIG. 11 is a section of the well of FIG. 7 after the tool has been removed;

FIG. 12 is a section of the well of FIG. 7 following installation of a cement plug.

DETAILED DESCRIPTION OF THE DRAWINGS

Figures 1, 2:
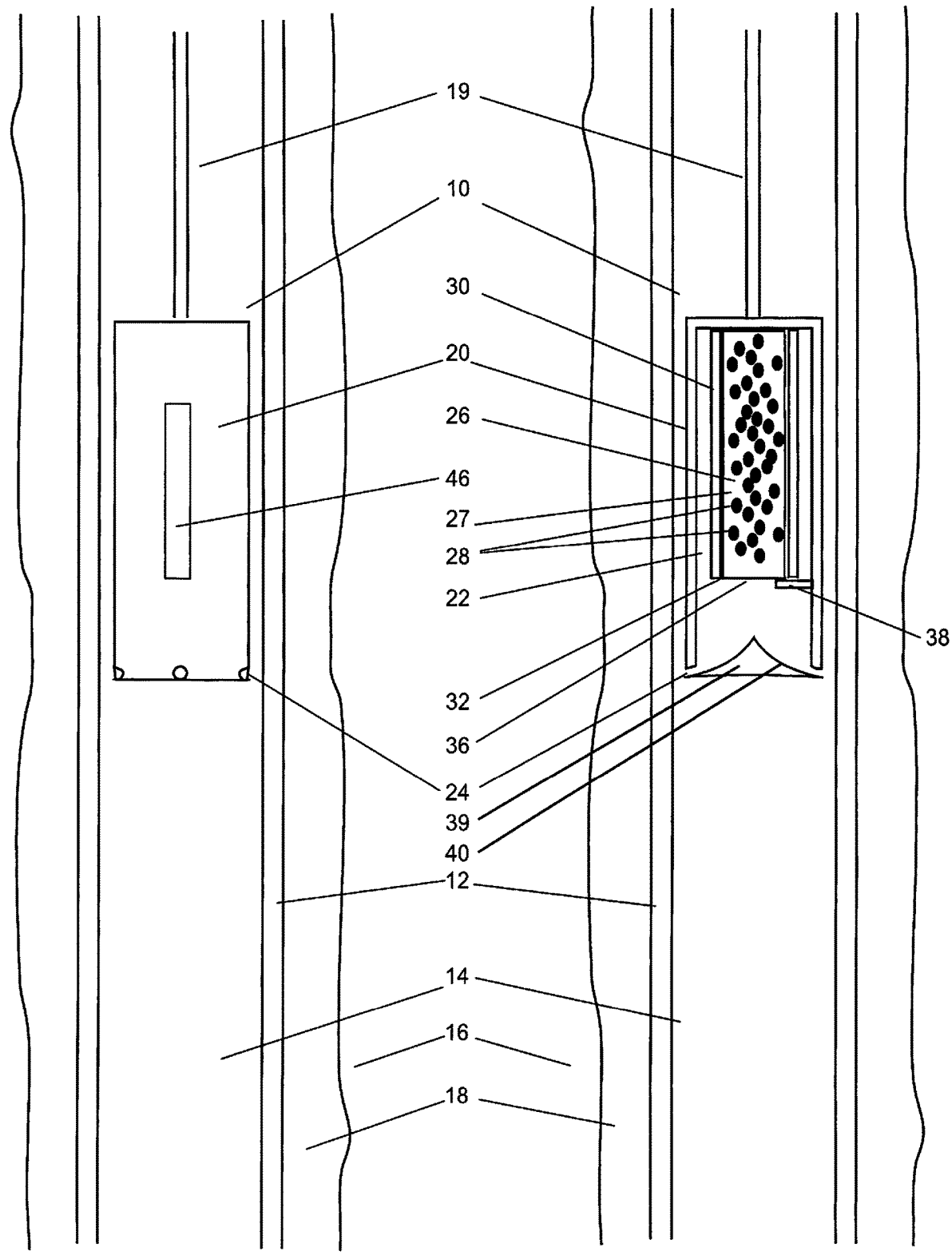
FIG. 1 is a side view of a tool for manipulating casing shown positioned in a section of a well according to a first embodiment of the present invention.
FIG. 2 is a section of the tool FIG. 1.

Reference is first made to FIG. 1, a side view of a tool, generally indicated by reference numeral 10, for manipulating casing 12 in a well 14 according to a first embodiment of the present invention. The casing 12 is shown attached to bedrock 16 by cement 18. Particularly, the tool 10 is for removing a section of the casing 12 and the cement 18 attaching the casing to the bedrock 16, to permit a cement plug to be installed in this section in advance of the well 14 being abandoned.

The tool 10 is lowered in to the well on a wireline 19 and anchored in position by three circumferentially displaced anchors 46 (of which one is visible on FIG. 1) to prevent axial movement of the tool 10, as will be explained in due course.

Additionally referring to FIG. 2, a section through the tool 10 of FIG. 1, it can be seen that the tool 10 comprises a housing 20 defining a chamber 22, the chamber 22 having a series of outlets 24 in the form of nozzles.

Inside the chamber 22 is a propellant source 26 containing a propellant 27 and particles of a modifying agent 28, in this case aluminium oxide. The propellant source 26 has a coating 30 which defines an opening 32 at an end of the coating 30, the opening 32 exposing a section 36 of the propellant 27 to the interior of the chamber 22. Adjacent the exposed propellant section 36 is an ignition mechanism 38 adapted to ignite the propellant section 36.

Directly below the propellant 27 is a deflector plate 39 defining a profiled deflection surface 40, the deflection surface 40 being profiled to direct a flow towards the outlets 24.

Figures 3, 4:
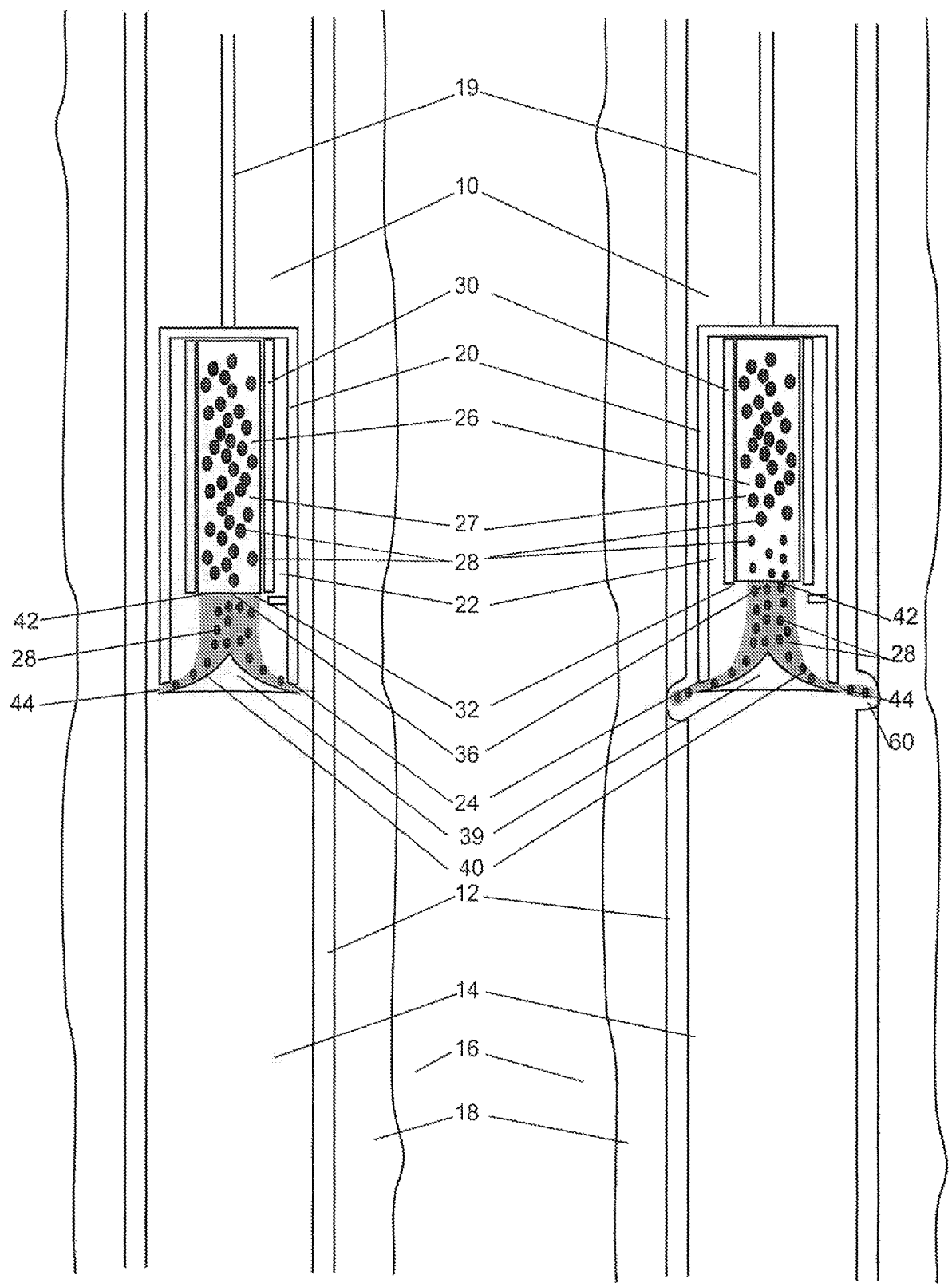
FIG. 3 is a section of the tool of FIG. 1 during deflagration of the propellant source.
FIG. 4 is a section of the tool of FIG. 1 during deflagration of the propellant source.

Operation of the tool 10 will now be described with reference to FIGS. 3 and 4, sections of the tool 10 of FIG. 1 showing the tool 10 in use. Referring firstly to FIG. 3, with the anchors (not shown in this Figure) in place, the ignition mechanism 38 has ignited the exposed propellant section 36 creating a combustion zone 42 on the propellant source 26. As the propellant 27 deflagrates, a stream of highly pressurised combustion products 44 is released. The stream of combustion products 44 is driven downwards away from the propellant 27 due to the pressure within the stream 44 and, in particular, generated at the combustion zone 42. Within the stream of combustion products 44 are the particles 28 of aluminium oxide which have been released from the propellant source 26. The thrust created by the stream of combustion products 44 is prevented from driving the tool 10 upwards by the anchors 46, therefore the thrust drives the stream 44 and the particles 28 towards the deflector plate 39.

The stream of combustion products 44 containing the particles 28 impacts on the deflector plate 39 and are deflected along the deflection surface 40 towards the outlets 24. The combustion products 44 and the particles 28 are funnelled through these nozzles 24 and impact on the casing 12.

The four nozzles 24 are spaced equidistant around the circumference of the housing 20, the nozzles 24 being arranged in opposed pairs. This arrangement keeps the tool 10 centralised in the well 14 as the thrust generated at each nozzle 24 is countered by the thrust generated by the nozzle 24 on the opposite side of the housing 20. However, the nozzles 24 are angled to the radius of the tool 10 such that the thrust generated by the nozzles 24 cause the tool 10 to rotate, such that the stream of combustion products 44 and the associated particles 28 cut a circumferential ring through the casing 12.

The stream of combustion products 44 has burned the aluminium oxide particles 28 such that they have sapphire-like properties. The stream of combustion products 44 has also accelerated the particles 28 and this combination of speed and heat induced change of properties results in the particles 28 carving into the casing 12 by displacing the casing material. In addition the stream of combustion products 44 heats the casing 12, facilitating the removal of material by the particles 28.

Referring to FIG. 4, the removal of the casing 12 strips back the casing 12 leaving exposed regions 60 of cement 18.

Figures 5, 6:
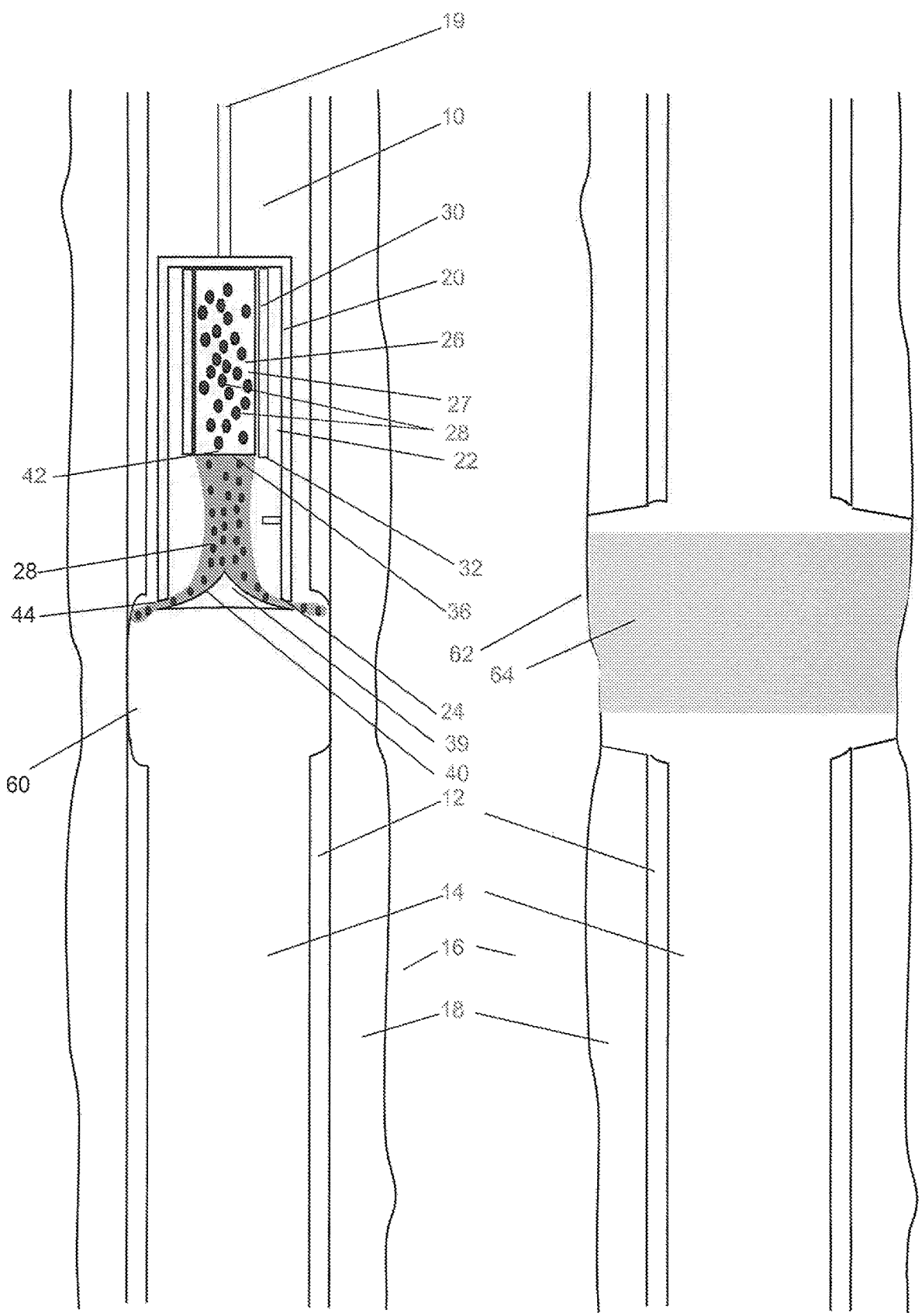
FIG. 5 is a section of the tool of FIG. 1 during deflagration of the propellant source.
FIG. 6 is a section of the well of FIG. 1 after the tool has been removed and a cement plug fitted.

Referring to FIG. 5, as propellant source 26 deflagrates, the coating 30 burns with it, exposing new propellant 27 to the combustion zone 42. With the deflagration of the propellant source 26 under control, the anchors 46 can be partially released to permit the tool 10 to rise slowly of the well 14 and create an extended section of exposed cement 18.

Once the propellant source 26 is exhausted, the exposed cement 18 can be removed. This cement 18 is weakened by the heat and the tool 10 is run in again (not shown) and the anchors 46 are applied to the weakened cement, causing the cement 18 to crumble and fall away leaving an exposed section 62 of bedrock 16 (FIG. 6).

This exposed section 62 can then be plugged with a cement plug 64 permitting the well 14 to be abandoned.

Figures 7, 8:
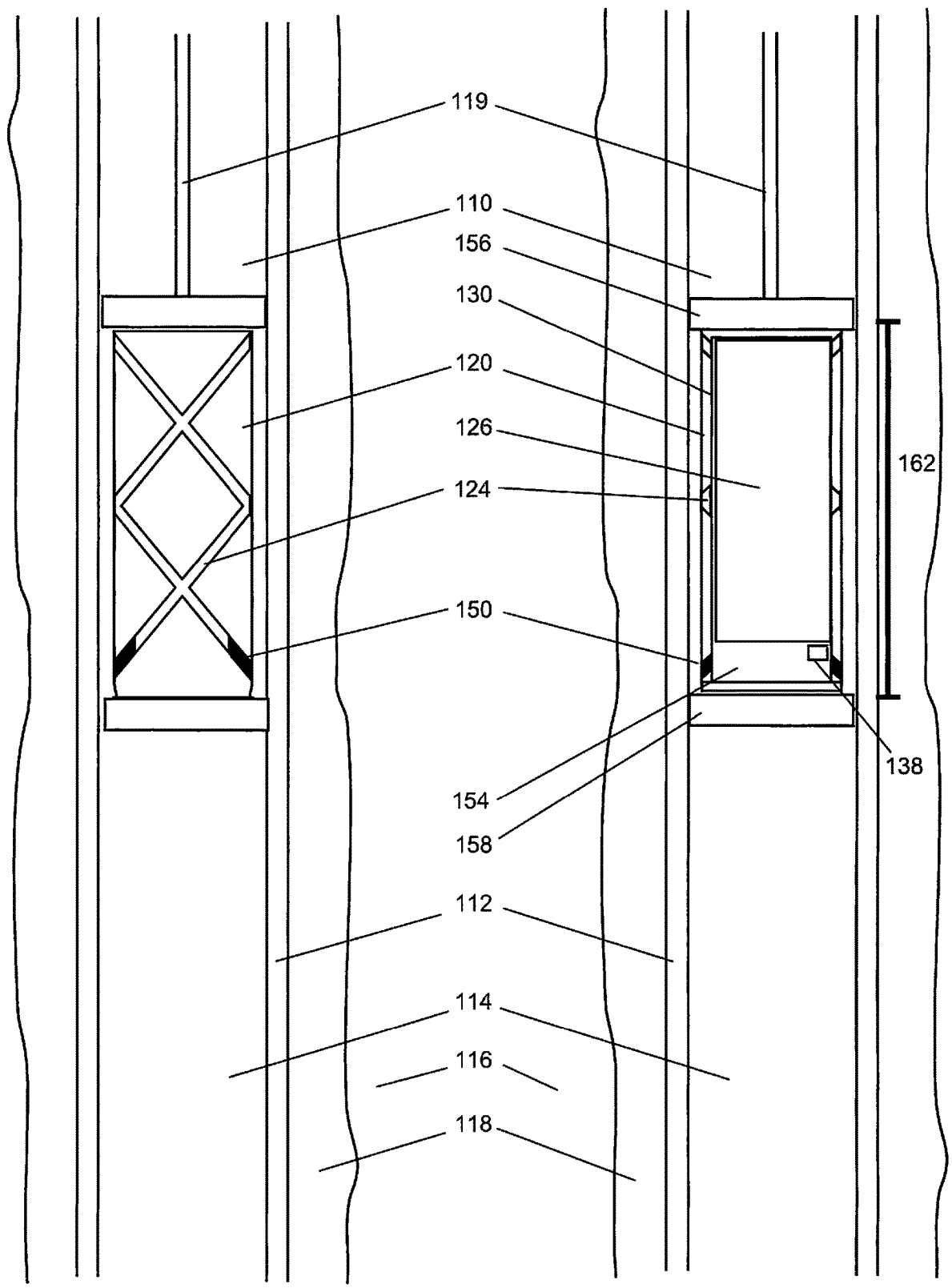
FIG. 7 is a side view of a tool for manipulating casing shown positioned in a section of a well according to a second embodiment of the present invention.
FIG. 8 is a section of the tool FIG. 7.

Reference is now made to FIG. 7, a tool 110 for manipulating casing 112 in a well 114 according to a second embodiment present invention.

The arrangement of the tool 110 and the surrounding well 114 is similar to that of the first embodiment and similar reference numerals have been used, incremented by 100. The tool 110 is for a similar purpose; that is to strip a section of casing 112 and associated cement 118 from bedrock 116.

The tool housing 120 includes an elongate lattice outlet arrangement 124. The outlet arrangement 124 extends the entire length of the housing 120.

Referring to FIG. 8, a section through the tool 110 of FIG. 7, this Figure shows the propellant source 126 as being much wider than the propellant source 26 of the first embodiment, the propellant source 126 filling the entire width of the housing 120.

Beneath the propellant source 126 is a void 154, the purpose of which will be discussed in due course.

As can be seen most clearly from FIGS. 7 and 8, the outlet 124 contains a frangible seal 150 which extends up the outlet 124 to above the top of the void 154. From the top of the seal 150 upwards, the outlet 124 is sealed by the propellant source covering 130. It will be noted there is no deflector plate on this embodiment.

The tool 110 of this embodiment further includes upper and lower packer seals 156, 158 for sealing a wellbore section 160.

Operation of the tool 110 will now be discussed. The tool 110 is lowered into position and the upper and lower packers 156, 158 are set to seal the wellbore section 160. It is in the section 162 that the casing 112 is to be manipulated.

Referring to FIG. 9, the ignition mechanism 138 (shown on FIG. 8) is activated and this ignites the exposed propellant section 136 creating a stream of combustion products 144 which fill the void 154. Pressure builds up inside the void 154 until a threshold pressure is reached which overcomes the strength of the frangible seal 150 breaking the seal and allowing the stream of combustion products to flow through the outlet 124.

As the outlet 124 is a slot rather than a circular nozzle, the flow of combustion products 144 comes out as a blade 180 rather than as a jet.

The housing 120 is made of a sacrificial material. As the flow of combustion products 144 passes through the outlet, the flow 144 skims off the housing edges 182 which define the outlets 124. A sacrificial material comes off in particulate form and becomes entrained in the flow 144, the particles 128 acting as the modifying agent 128 which is propelled onto the surface of the casing 112 to strip back the casing 112, leaving exposed regions of cement 160.

Referring to FIG. 10, a section view of the tool 110 of FIG. 7, as the propellant source 126 deflagrates, the coating 130 burns with it revealing more of the outlet 124.

Referring to FIG. 11, a section through the well 114 after the casing 112 has been stripped back to the cement 118 by the tool 110 of FIG. 7, once the propellant source 126 has fully deflagrated, a lattice arrangement of grooves 184 carved into the casing 112 showing the exposed cement 118.

Application of mechanical force, for example, on the well section 162 will remove the remaining casing fragments 186 and the exposed cement 118. Then, as per the first embodiment, a cement plug 164 can be installed in the well section 162, permitting the well 114 to be abandoned.

Figure 13:
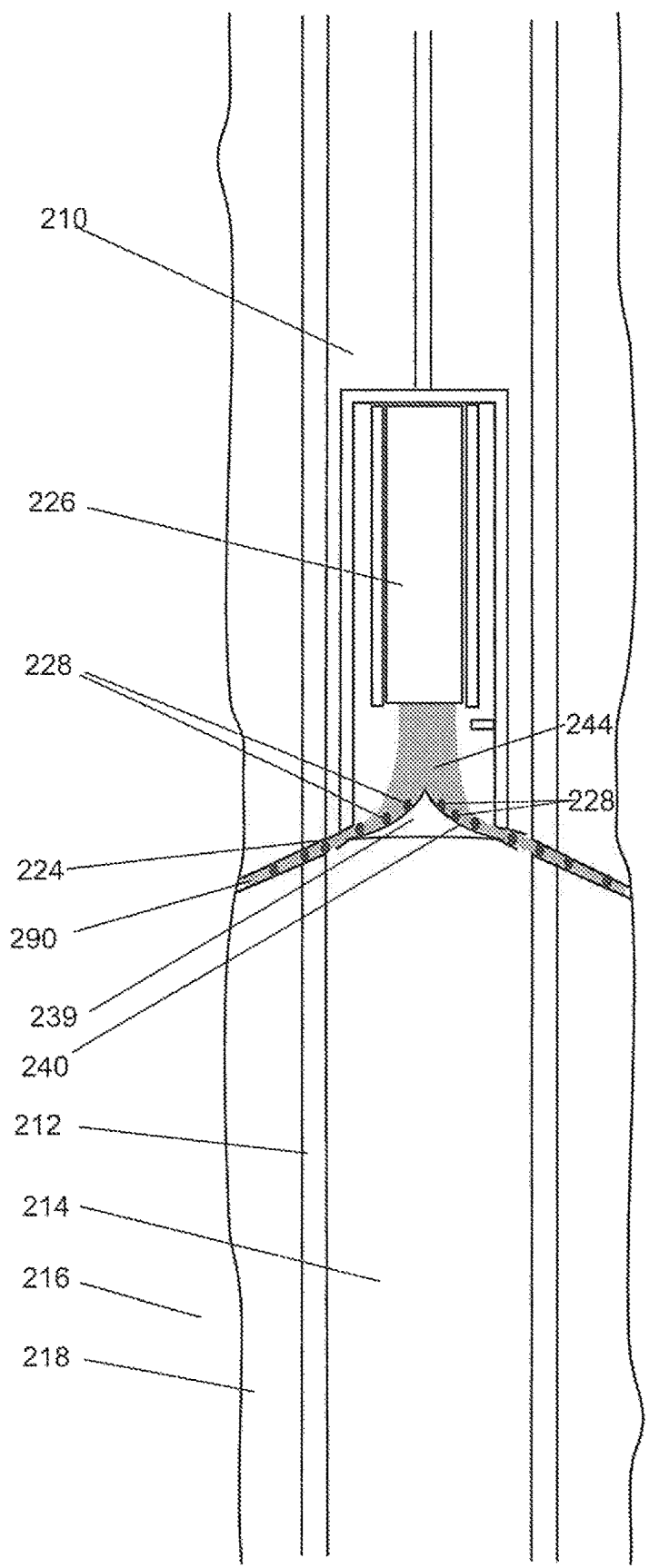
FIG. 13 is a section of a tool for manipulating casing shown positioned in a well during deflagration of the tool's propellant source according to a third embodiment of the present invention.

Reference is now made to FIG. 13, a tool 210 for manipulating casing 212 in a well 214 according to a third embodiment present invention.

The arrangement of the tool 210 and the surrounding well 214 is similar to that of the first embodiment and similar reference numerals have been used, incremented by 200. The tool 210 is for punching holes in a section of casing 212 and associated cement 218 through to the bedrock 216.

The primary differences between the tool 210 of this embodiment and the tool 10 of the first embodiment resides in, first, the outlets of the tool 210 being in the form of nozzles 224 which extend around the circumference of the tool 210. These nozzles 224 are directed downwardly to maximise the effect of moving casing material by impacting the casing at an acute angle.

The second difference resides in the deflector plate 239 which is a sacrificial plate from which the stream of combustion products 244 scours off the modifying agent 228. The stream of combustion products 244 with the entrained modifying agent 228 punch a ring of holes 290 through the casing 212 and cement 218.

Various modifications may be made to the above-described embodiments without departing from the scope of the invention. For example the nozzles may change the characteristics of the stream of combustion products by, for example, being cooled or being impregnated with material or being sonically resonated or by having a surface which is textured or grooved.

In other embodiments, the stream of combustion products may impart additional energy to the tubular. This energy may be in the form of heat. Additionally, the stream of combustion products may exert a pressure on the tubular. Alternatively or additionally the combustion products may exert a force on the tubular. For example, particulate within the combustion products and carried within the stream may impact the surface of the tubular and exert a force. This additional energy can be used to dislodge the manipulated casing and the associated cement securing it to the bedrock. There may be more than one mode of interaction with the tubular. For example, the tubular may be heated to melting point while at the same time subjected to pressure.

In further embodiments, the combustion products may enhance thermal conductivity by forming a flux or thermally conductive layer at the tubing or the combustion products may react at the tubular or in transit to the tubular. For example, particles may chemically react or combust at the tubing.

The invention claimed is:

1. A tool for manipulating a tubular in a downhole environment, the tool comprising:
   a housing defining a chamber, the chamber having at least one outlet;
   a propellant source located within the chamber;
   an ignition mechanism for igniting the propellant source;
   a sealing mechanism; and
   at least one modifying agent provided in or adjacent the tool or generated by the tool;
   wherein upon ignition of the propellant source, the propellant source is adapted to deflagrate, creating at least one stream of combustion products, the chamber directing the stream of combustion products through the/each outlet, towards the tubular to be manipulated, the/each stream of combustion products combining with at least one modifying agent to manipulate the tubular.

2. The tool of claim 1, wherein the tool is configured to be anchored to the tubular.

3. The tool of claim 1, wherein the/each stream of combustion products is generated without generating heat or with minimal heat generation.

4. The tool of claim 1, wherein the propellant source is arranged to create an intermittent stream of combustion products.

5. The tool of claim 1, wherein as the propellant source deflagrates, the propellant source defines a combustion zone and the combustion zone moves relative to the tubular to be manipulated.

6. The tool of claim 1, wherein the tool further comprises at least one deflector for deflecting the/each stream of combustion products.

7. The tool of claim 6, wherein the/each deflector is movable.

8. The tool of claim 6, wherein the/each deflector comprises a sacrificial material.

9. The tool of claim 8, wherein the sacrificial material contains the at least one modifying agent.

10. The tool of claim 1, wherein there are a plurality of said outlets.

11. The tool of claim 10, wherein the outlets extend circumferentially around the housing.

12. The tool of claim 10, wherein the outlets extend axially along the housing.

13. The tool of claim 10, wherein, the plurality of outlets open over a period of time.

14. The tool of claim 1, wherein the/or each outlets is sealed by an opening mechanism wherein the opening mechanism is adapted to open the/or each outlets in response to an environmental condition being reached.

15. The tool of claim 14, wherein the opening mechanism comprises a frangible portion.

16. The tool of claim 10, wherein at least some of the/each outlet points in convergent directions and their respective stream of combustion products converge at or beyond the target surface.

17. The tool of claim 1, wherein at least one outlet is a nozzle having a nozzle inlet and a nozzle outlet, the nozzle being in fluid communication with chamber.

18. The tool of claim 17, wherein at least one of the/each nozzle is moveable with respect to the housing.

19. The tool of claim 18, wherein at least one of the/each moveable nozzle moves defining a pattern on the tubular to be manipulated.

20. The tool of claim 1, wherein at least one outlet is adapted to enable a thrust force from an outlet to be used to move the tool in a well.

21. The tool of claim 1, wherein at least one outlet is adapted to enable a thrust force from an outlet to be used to bring the tool into closer proximity to the target.

22. The tool of claim 1, wherein at least one outlet is adapted to enable a thrust force from an outlet to be used to move components within the tool.

23. The tool of claim 1, wherein at least one outlet is adapted to enable a thrust from the outlet to move the outlet in a predefined path to cut predefined sections from the tubular.

24. The tool of claim 1, wherein the/each stream of combustion products releases at least one of the at least one modifying agent from a sacrificial tool portion.

25. The tool of claim 1, wherein the sealing mechanism is adapted to form a seal to isolate a section of tubular to be manipulated.

26. The tool of claim 1, wherein the tool comprises an enhancing mechanism for enhancing the/each stream of combustion products.

27. The tool of claim 26, wherein the enhancing mechanism changes the flow characteristics of the/each stream of combustion products.

28. The tool of claim 27, wherein the enhancing mechanism is the application of an eddy current to the/each stream of combustion products.

29. The tool of claim 28, wherein the eddy current is pulsed.

30. The tool of claim 26, wherein the enhancing mechanism imparts additional energy to the/each stream of combustion products or changes the shape and/or direction of the/each stream of combustion products.

31. The tool of claim 26, wherein the enhancing mechanism is oxygen to enhance the burning of the propellant or the tubular to be manipulated.

32. The tool of claim 26, wherein the enhancing mechanism includes the production of a gas, which displaces the fluid in the vicinity of the tool.

33. A method of manipulating a tubular in a downhole environment, the method comprising:
　a) positioning a tool adjacent a tubular to be manipulated, wherein the tool is configured to anchor to the tubular and comprises: a housing defining a chamber, the chamber having at least one outlet; a propellant source located within the chamber; an ignition mechanism for igniting the propellant source; and a sealing mechanism; and wherein at least one modifying agent is provided in or adjacent the tool, or is generated in use of the tool;
　b) anchoring the tool to the tubular;
　c) activating the sealing mechanism; and
　d) igniting the propellant source such that at least one stream of combustion products is generated, the chamber directing the/each stream of combustion products through the/each outlet, the outlet directing the/each stream of combustion products towards the tubular to be manipulated, whereby the/each stream of combustion products, including the modifying agent, manipulate the tubular.

* * * * *